United States Patent [19]

Pauluis et al.

[11] 4,055,398

[45] Oct. 25, 1977

[54] DUAL TEMPERATURE ISOTOPE EXCHANGE PROCESSES

[75] Inventors: Gerard J. Pauluis, Brussels, Belgium; Alistair I. Miller, Deep River, Canada

[73] Assignee: Atomic Energy of Canada Limited, Ottawa, Canada

[21] Appl. No.: 580,692

[22] Filed: May 27, 1975

[30] Foreign Application Priority Data

June 17, 1974 Canada .................................. 202594

[51] Int. Cl.² .......................... B01D 11/04; C01B 5/02
[52] U.S. Cl. .................................. 23/270.5 W; 23/260; 23/263; 423/580
[58] Field of Search .................. 423/580, 563, 648; 23/270.5 W, 260, 263

[56] References Cited

U.S. PATENT DOCUMENTS

| 3,411,884 | 11/1968 | Thayer | 423/580 H |
| 3,685,967 | 8/1972 | Thayer | 423/580 H |

FOREIGN PATENT DOCUMENTS 865,705  4/1961  United Kingdom ............ 423/580 H

*Primary Examiner*—Earl C. Thomas
*Attorney, Agent, or Firm*—James R. Hughes

[57] ABSTRACT

A dual temperature isotope exchange process of the type having a frist stage comprising a hot and cold tower with liquid and gas passing in countercurrent exchange relationship therein, the gas being recycled from the top of the cold tower to the bottom of the hot tower via a humidifier section through which the effluent liquid from the bottom fo the hot tower also passes, a dehumidifier between hot and cold towers through which both gas and liquid streams pass, wherein a third-phase stream acting as a heat transfer medium is passed through the dehumidifier, hot tower, humidifier and wherein said stream is recycled from the bottom of the humidifier to the top of the dehumidifier or alternatively to the top of the cold tower via fluid condition and temperature treatment apparatus. The heat transfer fluid is preferably a liquid and must be such as not to interfere or inter-react excessively with the gas-liquid exchange process.

2 Claims, 4 Drawing Figures

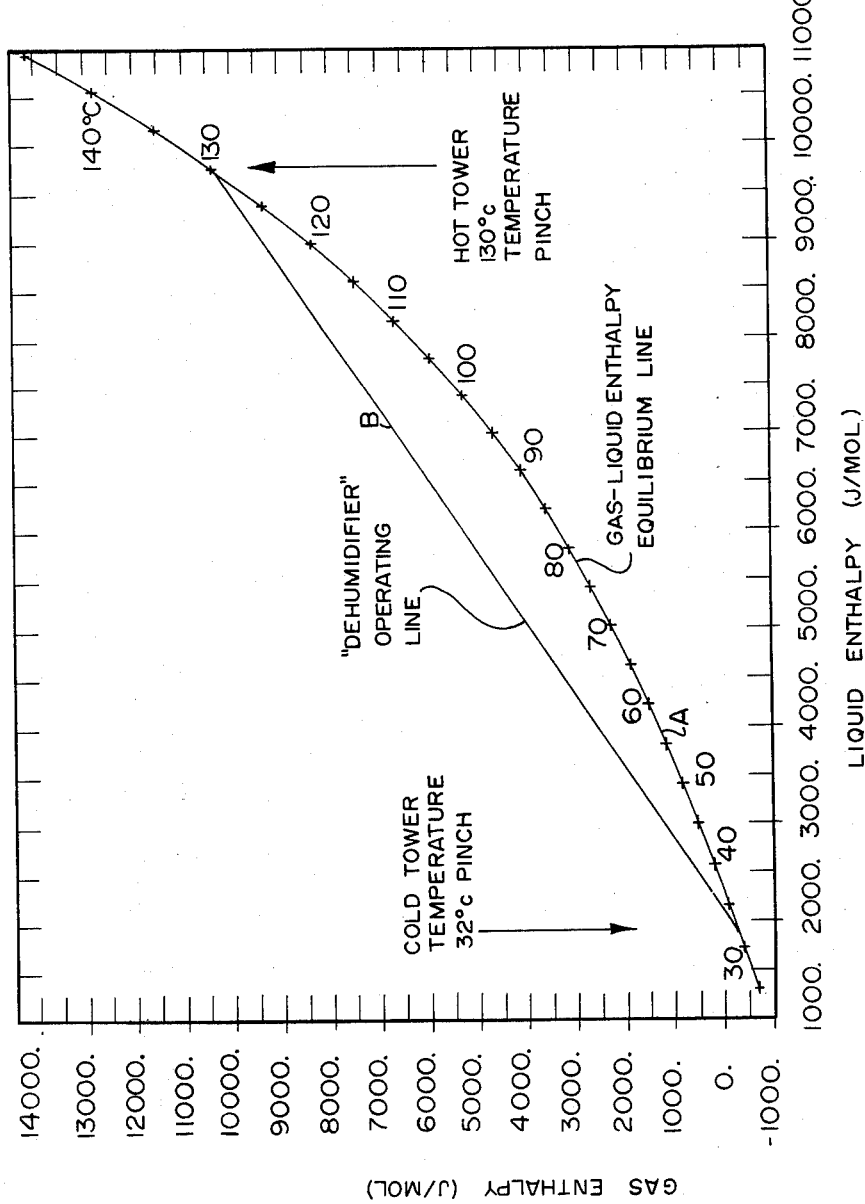

DUAL TEMPERATURE ISOTOPE EXCHANGE PROCESSES

This invention relates to dual temperature isotope exchange processes and more particularly to an improved heat exchange system between dehumidifier and humidifier in a liquid-gas deuterium exchange process of the GS (Girdler-Sulphide) type.

Present designs of the GS system require an indirect transfer (through a solid wall) of the heat release by the gas stream in the dehumidifier before this heat is applied to the humidifier. The most effective existing arrangement has direct contact heat exchange in the two sections (humidifier and dehumidifier) between the gas and two large stream of liquid which then interchange their heat content indirectly in a heat exchanger. The indirect exchange is necessary to avoid any mixing of the two liquid streams which differ greatly in deuterium content. This system works well but adds to the high capital costs of such systems.

It is an object of the present invention to provide an improved heat exchange means between humidifier and dehumidifier in a liquid-gas deuterium exchange process.

It is another object of the invention to provide a heat exchange arrangement between humidifier and dehumidifier in a liquid-gas deuterium exchange process that is efficient, generally simple, and low in capital cost.

These and other objects of the invention are achieved by a dual temperature isotope exchange process of the type having a first stage comprising a hot and cold tower with liquid and gas passing in countercurrent exchange relationship therein, the gas being recycled from the top of the cold tower to the bottom of the hot tower via a humidifier section through which the effluent liquid from the bottom of the hot tower also passes a dehumidifier between hot and cold towers through which both gas and liquid streams pass, the improvement comprising the passing of a third-phase stream acting as a heat transfer medium through the dehumidifier, hot tower, humidifier and recycling said stream from the bottom of the humidifier to the top of the dehumidifier or alternatively to the top of the cold tower via fluid condition and temperature treatment apparatus. The heat transfer fluid is preferably a liquid and must be such as not to interfere or inter-react excessively with the gas-liquid exchange process.

In drawings which illustrate an embodiment of an invention;

FIG. 4 is an enthalpy diagram for the liquid-gas exchange process.

Figure 1:
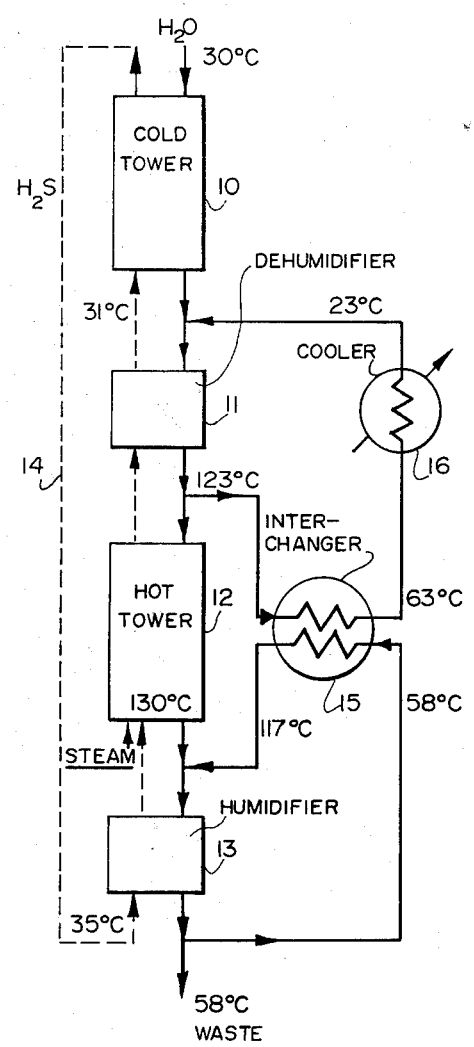
FIG. 1 is a flow diagram of a typical conventional GS process.

Referring to FIG. 1 a prior art GS process system is shown and comprises cold tower 10, dehumidifier 11 hot tower 12, and humidifier 13. The gas 14 ($H_2S$) is recycled from the top of the cold tower to the bottom of the humidifier and is in countercurrent exchange relation with the water (fed to the top of the cold tower) in the two towers. Heat exchange between dehumidifier and humidifier is effected by taking a portion of the liquid streams passing through these devices and contacting them (indirectly) in heat exchanger 15. A cooler 16 is normally required. It will be realized that many other devices such as pumps, strippers, etc. are required in the system to operate but the described diagram covers the main principles of a typical GS system. An output (either gas or liquid or both) may be taken from a point between towers and passed forward to the next stage of further treatment.

Figure 2:
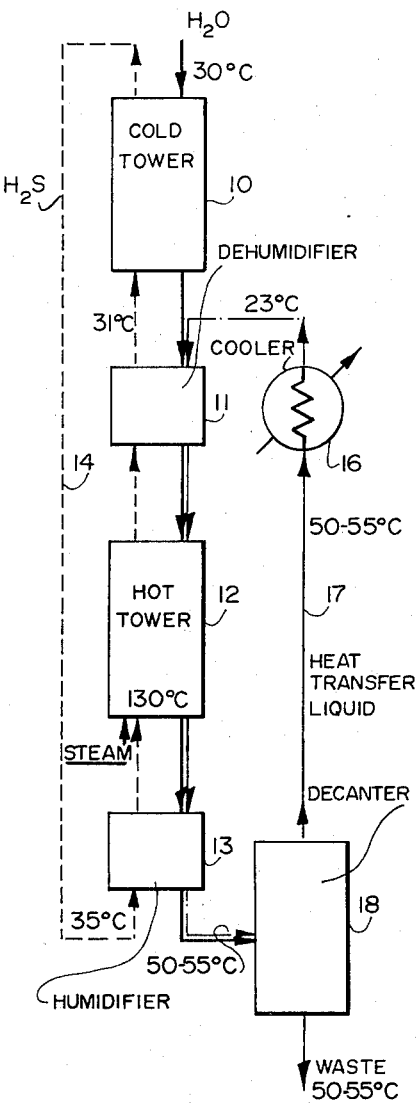
FIG. 2 is a flow diagram similar to that of FIG. 1 but with a third fluid stream.

FIG. 2 is similar to FIG. 1 but replaces the heat exchanger 15 with a heat transfer liquid flow 17 passing through dehumidifier 11, hot tower 12, and humidifier 13. The liquid is passed through decanter 18 or other devices that might be required to remove impurities and through cooler 16 before being recycled.

Figure 3:
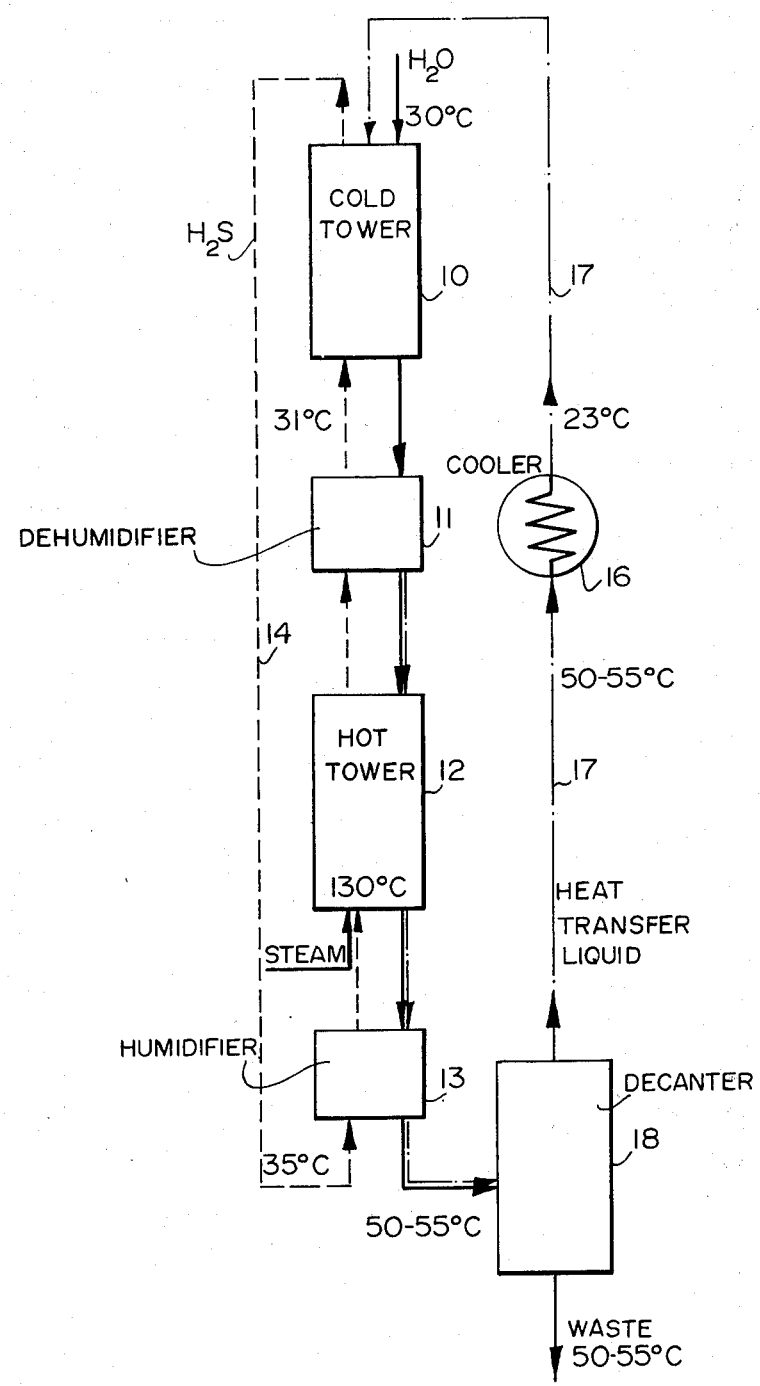
FIG. 3 is an alternative arrangement to that of FIG. 2.

FIG. 3 shows an arrangement similar to that of FIG. 2 but in this case the third phase flow 17 after passing through cooler 16 is fed to the top of cold tower 10.

By using a liquid, forming a separate phase with water (to facilitate the separation) and which either does not contain or contains tightly bonded hydrogen atoms, it is possible to eliminate the indirect heat exchange. It is even possible to leave both water and the heat transfer liquid flow together, down the hot tower, further enhancing the heat exchange, by allowing the heat transfer liquid to reach the hot tower operating temperature.

The following considerations dictate the selection of the heat transfer fluid:
1. Low reactivity with water and $H_2S$ at process conditions
   for isotope exchange
   for chemical reactions
2. Low degree of foaminess when mixed with water.
3. Low degree of mutual solubility of water and the liquid
4. Facility of separation of the water-liquid mixture
5. Low volatility
6. Low cost.

The paraffinic hydrocarbons above octane (nonane BP 150.7° C, MP −63.7° C) have sufficiently low vapour pressure. Probably a mixture around C9–C12 would be best, as the viscosity increases with the chain length. Because the density of these hydrocarbons is about 0.75 the density of water, the volumetric liquid flow of oil would be about 2.5 to 3 times the flow of water used normally for the heat exhcnage, this would means flows down the hot tower about 5 volumes of oil per volume of water. With proper tray design, however, this should not be a major problem. Other fluids that may be used eg. silicon oil, fluorinated hydrocarbons, amines.

Typical temperatures are shown in FIGS. 1 and 2 for both the classical and present process. By utilizing for example 6 trays in the dehumidifier and 18 trays in the humidifier sections, a steam economy of 33 percent may be achieved. If line bending is used this steam economy can be further enhanced.

There is another advantage, as a proper liquid/gas ratio can be kept in the dehumidifier section. The capital costs of the oil is very small, the capital cost of a decanter should not be higher than 0.25 times the cost of the humidifier-dehumidifier interchangers. The oil can also be expected to act as an extractive agent eliminating organic impurities for the system.

Although the above description covers the invention applied to a specific type of GS exchange process flow sheet, it can be applied to any dual temperature isotope exchange process.

FIG. 4 is a graph showing a typical gas/liquid enthalpy line (A) usually referred to as a Merkel diagram with a de-humidifier operating line (B) added. Because of the shape of the Merkel diagram, the temperature of the cold and hot tower can be held at the desired levels by sensitive adjustment of the third phase recycle. Both ends of the operating line tend quite naturally to pinch and the temperature corresponding to the mid dehumidifier would be a very responsive sensor of maladjustment in the third phase recycle rate (in a similar way as MCCR is a sensor of L/G adjustment). If necessary to counter excessive sensitivity, a small recycle could operate in the dehumidifier region. Such a recycle pre-exists where liquid is drawn off to and returned from a higher enrichment stage. The deuterium exchange inactive zone of the dehumidifier would be diminished in plates and more plates would thus be effective in deuterium enrichment, as $H_2O/H_2S$ ratio would not be perturbated.

We claim:

1. Apparatus for obtaining a product enriched in deuterium by dual temperature isotope exchange comprising:
   a. a cold tower containing isotope exchange trays with a liquid as a first phase stream passing downward and a gas as a second phase stream passing upward, through the trays in the tower in counter-current isotope exchange relationship therein,
   b. a hot tower containing isotope exchange trays with a liquid as a first phase stream passing downward and a gas as a second phase stream passing upward, through the trays in the tower in counter-current isotope exchange relationship therein,
   c. means for introducing the liquid as input to the top of the cold tower,
   d. a dehumidifier section,
   e. means for passing the said liquid from the bottom of the cold tower through the dehumidifier to the top of the hot tower,
   f. means for passing the said gas from the top of the hot tower through the dehumidifier to the bottom of the cold tower,
   g. a humidifier section,
   h. means for taking the said gas from the top of the cold tower and recycling it to the bottom of the hot tower via the said humidifier,
   i. means for passing a third-phase liquid stream through the dehumidifier and the hot tower,
   j. liquid separation means,
   k. means for taking the first phase liquid stream and the third phase liquid stream from the bottom of the hot tower and passing them through the said humidifier to the liquid separation means where the two streams are separated,
   l. means for taking the first phase liquid stream and passing to waste,
   m. means for recycling the third phase liquid stream from the liquid separator means to the top of the dehumidifier, and
   n. means for taking a product enriched in deuterium from the means for passing the said liquid from the bottom of the cold tower through the dehumidifier to the top of the hot tower.

2. Apparatus as in claim 1 wherein the means for recycling the said third phase liquid stream passes it from the liquid separator means through the cold tower before passing it to the top of the dehumidifier.

* * * * *